United States Patent Office 3,484,475
Patented Dec. 16, 1969

3,484,475
DIMERISATION AND HYDRODIMERISATION OF α,β - OLEFINICALLY UNSATURATED COMPOUNDS
David Arthur Cornforth, Dhafir Yusuf Waddan, and Derek Williams, Manchester, England, assignors to Imperial Chemical Industries Limited, London, England, a corporation of Great Britain
No Drawing. Filed Apr. 3, 1967, Ser. No. 627,681
Claims priority, applications Great Britain, Apr. 13, 1966, 16,179/66; Apr. 18, 1966, 16,907/66; June 7, 1966, 25,353/66; Nov. 16, 1966, 51,410/66; Jan. 6, 1967, 971/67; Mar. 17, 1967, 12,567/67
Int. Cl. C07c *121/26, 121/30;* B01j *11/00*
U.S. Cl. 260—465.8                      8 Claims

ABSTRACT OF THE DISCLOSURE

Michael acceptors, especially ester, amide or nitrile derivatives of acrylic acid, are converted to their dimers by contacting with a Group I–B metal catalyst, especially a copper catalyst. The same starting materials are converted to their dimers and/or hydrodimers by contacting with a hydrogen donor, especially molecular hydrogen, in the presence of the same catalyst.

---

This invention relates to the dimerisation and hydrodimerisation of organic compounds which are acceptors in Michael reactions, especially α,β olefinically unsaturated esters, amides and nitriles.

By the term "acceptors in Michael reactions" we mean compounds containing a group of general formula

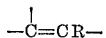

in which the group R is one which activates the double bond. Examples of such compounds may be found in "Organic Name Reactions" by Krauch and Kunz, 1964, John Wiley & Sons, at page 315, in "Name Reactions in Organic Chemistry" by A. R. Surrey, 2nd edition, 1961, Academic Press, at pages 173 to 174, and in "Name Index of Organic Reactions" by J. E. Gowan and T. S. Wheeler, 1960, Longmans, at pages 169 to 172. Such compounds will be referred to hereinafter as "Michael acceptors."

It has already been proposed to dimerise, for example, acrylonitrile by the use of certain catalysts, for example phosphines and certain metal catalysts. We have now found that Michael acceptors, especially acrylonitrile, may be converted to their dimers by reaction in the presence of a Group I–B metal catalyst. Moreover we have also found that if Michael acceptors, especially acrylonitrile, are reacted with each other and with a hydrogen donor in the presence of a Group I–B metal catalyst the product is usually a mixture of dimer and hydrodimer and furthermore that the yield of "total dimerised product" is greater than when no hydrogen donor is employed.

In our process the Michael acceptors are converted into compounds which are either dimers or hydrodimers. Each molecule of dimer or hydrodimer is formed by joining two molecules of the Michael acceptor, and therefore has a carbon skeleton double that of the Michael acceptor. A compound containing a radical of the general formula

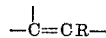

is converted into a dimer containing a radical having one of the following general formulae

 (Formula I)

 (Formula II)

 (Formula III)

 (Formula IV)

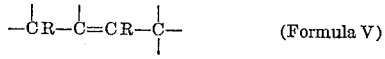 (Formula V)

or into a mixture of such dimers.

It may also be converted into a hydrodimer in which the olefinic bond of the radical of general formula

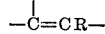

becomes saturated. However, where the Michael acceptor contains a group, other than the said olefinic bond, which is susceptible to reduction this group, may, where the conditions of the reactions are appropriate, be reduced also, and the term hydrodimer also embraces the products of the reaction where such further reduction takes place. Thus a compound containing a radical of the above general formula

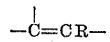

is converted into a hydrodimer containing a radical of the general formula

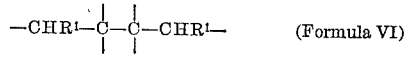 (Formula VI)

or into a compound containing a radical of the general formula

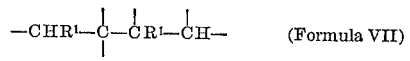 (Formula VII)

or into a mixture of such compounds. The group $R^1$ may represent the group R where the group R is susceptible to reduction, the group $R^1$ may, if the reaction conditions are appropriate, represent a group derivable from R by reduction. The two groups $R^1$ may have a different significance in any one radical of Formula VI or Formula VII. Where the hydrodimer contains a said radical in which both the groups $R^1$ represent the group R the hydrodimer is a dimer of the Michael acceptor with the addition of two atoms of hydrogen per mole of dimer.

Dimers containing a group of the above Formula I or II, or hydrodimers containing a group of the above Formula VI, formed by joining the β-carbon atoms of the olefinic bonds of the two molecules of monomer, are conveniently referred to as "head-to-head" dimers or hydrodimers, whereas dimers containing a group of the above Formula III, IV or V or hydrodimers containing a group of the above Formula VII, formed by an attachment of the β-carbon atom of the olefinic bond of one molecule of the monomer to the α-carbon atom of the olefinic bond of another molecule of the monomer are conveniently referred to as "head-to-tail" dimers or hydrodimers.

Where a hydrogen donor is used in our process the product is usually a mixture of a dimer and hydrodimer (as hereinbefore defined) and we shall refer to such a mixture as the "total dimerised product."

Our invention provides a process for the conversion of Michael acceptors to their dimers which comprises contacting them with a Group I–B metal catalyst.

A further preferred feature of the invention provides a process for the conversion of Michael acceptors to their dimers and/or hydrodimers which comprises contacting them with a hydrogen donor in the presence of a Group I–B metal catalyst.

Michael acceptors to which the process of our invention is applicable include $\alpha,\beta$-olefinically unsaturated aldehydes, ketones, acids, esters, amides, nitriles, alcohols and compounds containing an olefinically unsaturated group joined through one of its olefinically unsaturated carbon atoms to an aryl radical, a pyridyl radical or a halogen atom. They include compounds containing a group of the general formula

in which R represents the group —CHO, the group —CO$_2$H, the group —CN, the group —OH, the group —CO$_2$X, the group —COX (in which two last groups X represents an organic radical, preferably a hydrocarbon radical), the group —ONXY (in which X and Y independently represent a hydrogen atom or an organic radical, preferably a hydrocarbon radical), an aryl radical, a pyridyl radical or a halogen atom. The process of our invention is particularly applicable to the conversion to dimers and/or hydrodimers of $\alpha,\beta$-olefinically unsaturated esters, amides or nitriles and is especially applicable to the ester, amide or nitrile derivatives of acrylic acid or a substituted acrylic acid. The process is of special importance when applied to the lower alkyl esters of acrylic acid as starting materials and of outstanding importance when applied to acrylonitrile. Other specific compounds which may be used as starting material include acrolein, crotonaldehyde, cinnamaldehyde, methyl vinyl ketone, crotononitrile, methylacrylonitrile, 1-cyano-1,3-butadiene, acrylamide, methacrylamide, methyl acrylate, ethyl acrylate, methyl methacrylate, ethyl methacrylate, ethyl crotonate, 2-vinylpyridine, 4-vinylpyridine, 2-cyclohexen-1-one, 1-acetyl-1-cyclopentene, vinyl chloride and styrene.

The process is also applicable to mixtures of Michael acceptors.

By the hydrogen donor which is used in the preferred process of our invention we mean a compound which, under the conditions of the reaction, is capable of supplying hydrogen. In many cases the hydrogen donor will be molecular hydrogen but other compounds may serve as the hydrogen donor, for example metal hydrides such as calcium hydride, sodium borohydride and lithium aluminium hydride, metal alkyls such as aluminium triethyl and zinc dibutyl, and hydrogen transfer agents such as isopropanol and cyclohexene.

The Group I–B catalyst is usually a salt, compound, or complex of a metal of Group I–B of the Periodic System. The catalyst may consist of a mixture of Group I–B metal catalysts, or may consist of a mixture of one or more Group I–B metal catalysts with a metal catalyst from another group of the Periodic System or with a non-metallic co-catalyst. Where the Group I–B metal catalyst is a salt it may, for example, be an inorganic acid salt, for example a halide, or an organic acid salt, for example the salt of an aliphatic acid such as acetic acid, the salt of an organic enol or phenol, for example acetylacetone or p-cresol respectively, or the salt of an acidic ion exchange resin. It may also be in the form of a double salt. The Group I–B metal catalyst may be a metal complex, for example a metal complex in which the co-ordinating ligand is an olefine, cyclo-olefin or polyolefin which may be substituted.

As the Group I–B metal in the catalyst we prefer to use copper.

When the Group I–B metal catalyst is a metal complex we prefer that it contains ligands other than strongly II-bonded ligands. Strongly II-bonded ligands include carbonyls and nitrosyls. Suitable ligands include phosphines, for example triphenylphosphine, and olefins and cyclo-olefins, for example butadiene and cyclooctadiene. Other particularly suitable ligands are diphenylamine and triphenylamine which are helpful in producing a fluid reaction mixture.

As already mentioned the catalyst may consist of a mixture of one or more Group I–B metal catalysts with a metal catalyst from another group of the Periodic System, and it is sometimes advantageous to use such a mixed catalyst.

Particularly advantageous mixtures of metal catalysts which may be used are mixtures of copper salts, especially cuprous salts, with salts of other metals. Particularly suitable for mixing with cuprous salts are the salts of the metals of Group VIII and especially the salts of the platinum group of metals (platinum, palladium, rhodium, ruthenium, osmium and iridium). Mercury salts may also be mixed with cuprous salts.

By using such mixtures of metal salts as the catalysts, a more effective catalyst is obtained than when a single metal is present. Thus, in general, a higher conversion to "total dimerised product" is obtained. Further we have found that, in some cases, another metal salt has a stabilising effect on a catalyst containing a Group I–B metal salt. Thus, for example, a ruthenium salt or a mercuric salt has a stabilising effect on a catalyst containing a cuprous salt.

Where the mixture of metal salts includes a salt of one of the platinum group of metals we have found that only a small proportion of the platinum metal salt is effective in greatly enhancing the catalytic effect of another metal salt. Thus a catalyst containing cuprous chloride and less than 1% of its weight of ruthenium trichloride is considerably more effective than a catalyst containing cuprous chloride as the only metal constituent.

The catalyst may also be used in admixture with a base or with a Lewis base or with a mixture of a base and a Lewis base. Suitable bases are inorganic or organic bases and include alkali or alkaline earth metal hydroxides or salts thereof with weak acids, phenols or alcohols, for example sodium acetate, sodium phenate, sodium carbonate or sodium ethoxide, as well as organic tertiary amines. A Lewis base is an electron donor.

Particularly suitable Lewis bases for incorporation with the catalyst used in the process of our invention are those which are organic compounds containing one or more of the elements phosphorus, nitrogen, oxygen, sulphur, arsenic and antimony, especially phosphines, phosphites, nitriles, amines, amides, ethers, epoxides, sulphides, sulphoxides or sulphones.

Particularly suitable phosphorous containing compounds are organic phosphines where the organic radicals may, for example, be alkyl, aryl, aralkyl, or cycloalkyl groups, which may be substituted. Particular examples are tributyl phosphines, triphenyl phosphine, tris(cyclohexyl)-phosphine, phenyl diethyl phosphine, tribenzyl phosphine, tris(p-methoxyphenyl)-phosphine. Also suitable are organic phosphites especially alkyl, aryl, alkaryl or cycloalkyl phosphites which may be substituted on the organic radical and of which particular examples are tri-n-butyl phosphite, triphenyl phosphite, tris(p-tolyl)phosphite, tribenzyl phosphite and phenyldiethyl phosphite. Other phosphorus containing compounds which may be utilised are phosphates, phosphonates, phosphine oxides, phosphinates, phosphamidates and dithiophosphates. Particularly suitable nitrogen compounds are organic amines. As examples of such amines there may be mentioned triethylamine, tri-n-butylamine, aniline, p-toluidine, dimethylaniline, ethylenediamine, n-hexylamine, diazabicyclooctane, piperazine, diethylene triamine and triethanolamine, diphenylamine and triphenylamine. Further examples of suitable Lewis bases are dimethylsulphoxide, dimethylformamide, propylene oxide and diethyl ether.

The proportions of Group I–B metal catalyst to Lewis base may cover a wide range; particularly suitable are ratios in the region 1:1 to 1:10. A mixture of Lewis bases may be used.

Where, as described hereinafter, an ion exchange resin is used as a catalyst support, that ion exchange resin, if it is a basic anion exchange resin, may serve as a Lewis base.

In certain cases it is desirable to add to the reaction medium an organic amine to improve the solubility and to facilitate the reaction. The amines which may be used for this purpose are included within the class of Lewis bases hereinbefore described. Particularly suitable amines are aliphatic tertiary amines, especially triethylamine.

As specific examples of suitable catalysts there may be mentioned cuprous chloride, cupric chloride, copper II acetylacetonate and cupric acetate.

The catalyst may be used on a suitable catalyst support, for example alumina, silica, carbon, pumice or kieselguhr. Particularly suitable catalyst supports are ion exchange media. Such ion exchange media may be inorganic, for example they may consist of certain oxides or related materials specific examples of which are alumina, zirconia, silica or clay. Alternatively they may be organic ion exchange resins. These resins may be of the cation or anion exchange type, and may therefore be either basic or acid. Strongly basic anion exchange resins are particularly suitable.

The catalyst is normally used in catalytic amount, that is in substantially less than stoichiometric amount. The amount of catalyst used normally falls within the range 10 to 50,000 parts per million parts of the Michael acceptor.

The process of our invention is effected by contacting the Michael acceptor with the catalyst.

The preferred process of our invention is effected by contacting the Michael acceptor with the hydrogen donor in the presence of the catalyst. In either case the temperature and duration of reaction may vary widely. Temperatures between −20° C. and 500° C. and times from 0.25 hour to 40 hours are generally found to be suitable. However, we prefer to use temperatures within the range 50–300° C. Moreover shorter times of contact may be used particularly if the process is operated with recycling of reactants for example in a continuous manner, so that only low conversion to product for each pass of reactant is required. The reaction may be carried out under pressure, and where the hydrogen donor is molecular hydrogen this is normally the case. Pressures from 1 atmosphere up to 250 atmospheres are generally found to be suitable, but in the case of molecular hydrogen partial pressure of hydrogen below 1 atmosphere may be used in some instances.

The reaction may if desired be carried out in a solvent, for example in acetonitrile, or in other solvents which are inert under the reaction conditions, for example hydrocarbon solvents such as benzene, toluene and cyclohexane, chlorinated hydrocarbons such as chlorobenzene, and oxygen containing organic compounds such as ethylene glycol monomethyl or monoethyl ether and dioxan.

The dimer and/or hydrodimer may be separated from the reaction mixture for example by distillation, if necessary under reduced pressure, or by crystallization where the product is a solid. Where the product is a mixture of dimer and hydrodimer the constituents of the mixture may be separated from each other. On the other hand it may be merely necessary to separate the "totol dimerised product" from any by-products of the reaction, since the "total dimerised product" may be a valuable and usable product as such. Thus in the case of acrylonitrile as starting material, the "total dimerised product" may consist of a mixture of isomeric 1,4-dicyanobutenes as dimers together with adiponitrile and possibly hexamethylene diamine as hydrodimers. Such a mixture can be converted by suitable reduction techniques into the sole product hexamethylene diamine.

In the preferred process of our invention in which dimerisation is effected in contact with a hydrogen donor, especially molecular hydrogen, a higher yield of "total dimerised product" is obtained and further there is a greater tendency to produce head-to-head dimers and hydrodimers rather than head-to-tail compound. The preferred process is particularly useful for the conversion of acrylonitrile into its head-to-head dimers, (namely 1,4-dicyanobutenes) and hydrodimers (namely adiponitrile and hexamethylene diamine). The presence of the hydrogen donor, in the case of acrylonitrile, reduces the tendency to the formation of head-to-tail dimers and hydrodimers (namely 2-methylene glutaronitrile, 2-methylglutaronitrile and 2-methylpentamethylenediamine) and of saturated monomer (namely propionitrile). The head-to-head dimers and hydrodimers of acrylonitrile obtained by our preferred process or a mixture thereof is particularly suitable for conversion into hexamethylene diamine by reduction (hydrogenation). Hexamethylene diamine is an intermediate for industrially important synthetic linear fibre-forming polyamides, for example polyhexamethylene adipamide (nylon 66) obtained by polycondensation of the diamine with adipic acid.

The invention is illustrated but not limited by the following examples in which the parts and percentages are by weight except where otherwise stated and in which the ratio of parts by weight to parts by volume is that of the kilogram to the litre.

EXAMPLE 1

A mixture of cuprous chloride (1.33 parts by weight) and acrylonitrile (10 parts by volume) was left at room temperature for 5 hours and the mixture decomposed by the addition of a solution of sodium tert-butoxide (0.389 part by weight) in benzene (5 parts by volume) at room temperature.

Trans-1,4-dicyanobutene-2 was found to be the only product apart from unreacted acrylonitrile.

EXAMPLE 2

1.006 parts of cuprous chloride were dissolved in 25 parts by volume of acrylonitrile in an autoclave and 9.14 parts of triethylamine added under nitrogen. The autoclave was pressurized to 30 atmospheres of hydrogen and heated for 8 hours at a maximum temperature of 350° C. The product was dissolved in 2 N hydrochloric acid and precipitated as a thick oil on adding sodium hydroxide solution. On heating the oil hexamethylene diamine sublimed from it.

EXAMPLE 3

A mixture of acrylonitrile (20 parts), cuprous chloride (1.825 parts) and triethylamine (14.3 parts) was heated under 30 atmospheres pressure of hydrogen at 120° C. for 20 hours. The product contained cis- and trans-1,4-dicyanobutene-1, trans-1,4-dicyanobutene-2 and adiponitrile (48% yield by G.L.C. analysis based on acrylonitrile used).

EXAMPLE 4

A mixture of acrylonitrile (25 parts), cuprous chloride (0.339 part), ruthenium chloride (0.001 part), and triethylamine (2.9 parts) was heated under 30 atmospheres pressure of hydrogen at 120° C. for 20 hours. The product contained cis- and trans-1,4-dicyanobutene-1, trans-1,4-dicyanobutene-2 and adiponitrile (62% yield by G.L.C. analysis based on the acrylonitrile charged).

The above experiment may be compared with Example 3 which shows the effect of a catalyst containing cuprous chloride in the absence of another metal salt. Ruthenium chloride alone at this concentration would give about 1% yield of head-to-head dimers.

EXAMPLE 5

A mixture of acrylonitrile (30 parts), cuprous chloride (1.015 parts), mercuric bromide (0.561 part), and triethylamine (9.8 parts) was heated under 30 atmospheres pressure of hydrogen at 120° C. for 20 hours. The product contained cis- and trans-1,4-dicyanobutene-1, trans- 1,4-dicyanobutene-2 and adiponitrile (21% by G.L.C. analysis based on acrylonitrile charged).

EXAMPLE 6

Alumina (30 parts, 6–16 mesh) was treated with triethylamine (37 parts) and then excess triethylamine was removed in vacuo. A solution containing cuprous chloride (3.8 parts) and ruthenium chloride (0.317 part) in acrylonitrile (30 parts) was then added and excess acrylonitrile was removed in vacuo. The catalyst was placed in a glass tube reactor (18 inches long, 0.6 inch diameter) a stream of hydrogen under atmospheric pressure was passed through at the rate of 1000 cc./hour and acrylonitrile was introduced at the rate of 12 cc./hour at 150° C. The product contained 1,4-straight chain dimers in 40% yield on acrylonitrile converted.

EXAMPLE 7

A mixture of acrylonitrile (20 parts), cuprous chloride (0.17 part) and triphenyl phosphite (1.1 parts) was heated under 27 atmospheres pressure of hydrogen at 120° C. for 20 hours.

The mixture of unreacted acrylonitrile (14.9 parts) and propionitrile (0.23 part) was removed at atmospheric pressure to yield a high boiling residue (1.1 parts) which G.L.C. analysis showed to contain adiponitrile (0.3 part) and 1,4-dicyanobutene (0.1 part).

EXAMPLE 8

A mixture of acrylonitrile (20 parts), cuprous chloride (0.174 part) and triphenyl phosphine (0.92 part) was heated under 27 atmospheres pressure of hydrogen at 120° C. for 20 hours.

Unreacted acrylonitrile (11 parts) was removed at atmospheric pressure and the residue distilled at 0.5 mm. Hg to yield to dimeric products (1.15 parts).

G.L.C. analysis of the high boiling distillate showed that it contained, 1,3-dicyanobutene-3; 1,2-dicyanobutane and 1,4-dicyanobutene.

EXAMPLE 9

A sample of the reaction product obtained by the process of Example 3 was distilled and unreacted acrylonitrile and some propionitrile removed at atmospheric pressure. The remaining higher boiling material was fractionally distilled and the material boiling at 122–125° C. at 1–2 mm. Hg was shown by G.L.C. analysis to be a mixture cis- and trans-dicyanobutene-1, containing a trace of 1,4-dicyanobutene-2, and adiponitrile.

We claim:

1. A process for the conversion of acrylonitrile to a member selected from the group consisting of 1,4-dicyanobutene, hydrogenation products of 1,4-dicyanobutene and mixtures thereof which comprises contacting the acrylonitrile with at least one catalyst consisting essentially of a copper salt of an inorganic or organic acid selected from cuprous chloride, cupric chloride, copper II acetylacetonate and cupric acetate at a temperature between −20° C. and 500° C. and a pressure between 1 and 250 atmospheres.

2. A process according to claim 1 and further carried out in the presence of molecular hydrogen hexamethylene diamine which comprises contacting it with molecular hydrogen in the presence of a catalyst which consists essentially of a copper salt of an inorganic or organic acid.

3. The process of claim 2 in which the catalyst is used in admixture with a base selected from alkali metal hydroxides, alkaline earth metal hydroxides, sodium acetate, sodium phenate, sodium carbonate, sodium ethoxide and sodium tert-butoxide.

4. The process of claim 2 in which the catalyst is used in admixture with a Lewis base selected from tributyl phosphines, triphenyl phosphine, tris(cyclohexyl)phosphine, phenyl diethyl phosphine, tribenzyl phosphine, tris-(p-methoxyphenyl)-phosphine, tri-n-butyl phosphite, triphenyl phosphite, tris(p-tolyl)phosphite, tribenzyl phosphite, phenyldiethyl phosphite, triethylamine, tri-n-butylamine, aniline, p-toluidine, dimethylaniline, ethylenediamine, n-hexylamine, diazabicyclooctane, piperazine, diethylene triamine and triethanolamine, diphenylamine and triphenylamine, dimethylsulphoxide, dimethylformamide, propylene oxide and diethyl ether.

5. The process of claim 2 in which the catalyst is said copper salt and is used in admixture with a ruthenium salt.

6. The process of claim 2 in which the catalyst is a cuprous salt and is used in admixture with a mercuric bromide.

7. The process of claim 1 in which the copper is present as cuprous chloride.

8. The process of claim 5 in which the catalyst is cuprous chloride and is used in admixture with less than 1% of its weight of ruthenium trichloride.

References Cited

UNITED STATES PATENTS 2,443,420   6/1948   Gresham _____ 260—465.8 XR
2,452,187   10/1948   Gresham _____ 260—465.8 XR JOSEPH P. BURST, Primary Examiner U.S. Cl. X.R.

260—290, 485, 537, 561, 586, 593, 599, 601, 635, 651, 668